United States Patent
Rothschild

(10) Patent No.: US 6,567,823 B1
(45) Date of Patent: May 20, 2003

(54) CHANGE PROPAGATION METHOD USING DBMS LOG FILES

(75) Inventor: Michael Rothschild, Ramot Hashavim (IL)

(73) Assignee: Corigin Ltd., Or-Yehuda (IL)

( * ) Notice: Subject to any disclaimer, the term of this patent is extended or adjusted under 35 U.S.C. 154(b) by 318 days.

(21) Appl. No.: 09/633,332

(22) Filed: Aug. 7, 2000

(51) Int. Cl.[7] .............................. G06F 7/00
(52) U.S. Cl. ................................ 707/104.1
(58) Field of Search .................. 707/103, 200, 707/201, 100, 101, 1, 2, 4, 3, 203, 204, 202, 104.1

(56) References Cited

U.S. PATENT DOCUMENTS

| | | | | |
|---|---|---|---|---|
| 4,498,145 A | * | 2/1985 | Baker et al. ............... | 707/202 |
| 5,613,111 A | * | 3/1997 | Malatesta et al. .......... | 707/2 |
| 5,781,910 A | * | 7/1998 | Gostanian et al. .......... | 707/10 |
| 6,151,608 A | * | 11/2000 | Abrams ...................... | 707/100 |
| 6,167,405 A | * | 12/2000 | Rosensteel et al. ......... | 707/102 |
| 6,334,215 B1 | * | 12/2001 | Barker et al. ............... | 707/4 |
| 6,343,296 B1 | * | 1/2002 | Lakhamraju et al. ....... | 707/102 |
| 6,370,524 B1 | * | 4/2002 | Witkowski .................. | 707/2 |
| 6,430,579 B1 | * | 8/2002 | Furminger et al. ......... | 707/203 |

\* cited by examiner

*Primary Examiner*—John Breene
*Assistant Examiner*—Miranda Le
(74) *Attorney, Agent, or Firm*—Herbert Dubno

(57) ABSTRACT

A change propagation method for a migration from a source table to a target table in a DBMS which uses the log file available in the DBMS for recovery from failures. From this log file a last data-independent key is derived to represent an immediate previous migration and a condense table is generated with records representing before and after images of a data row which has changed in the source table. For each source table in a migration definition files containing delete statements, update statements, an insert table and an ignore file are provided. A target table is updated based upon commands in an insert statement file generated from the migration statement, the ignore file, the source table and the insert table.

2 Claims, 13 Drawing Sheets

FIG.3 Eliminate redundant changes
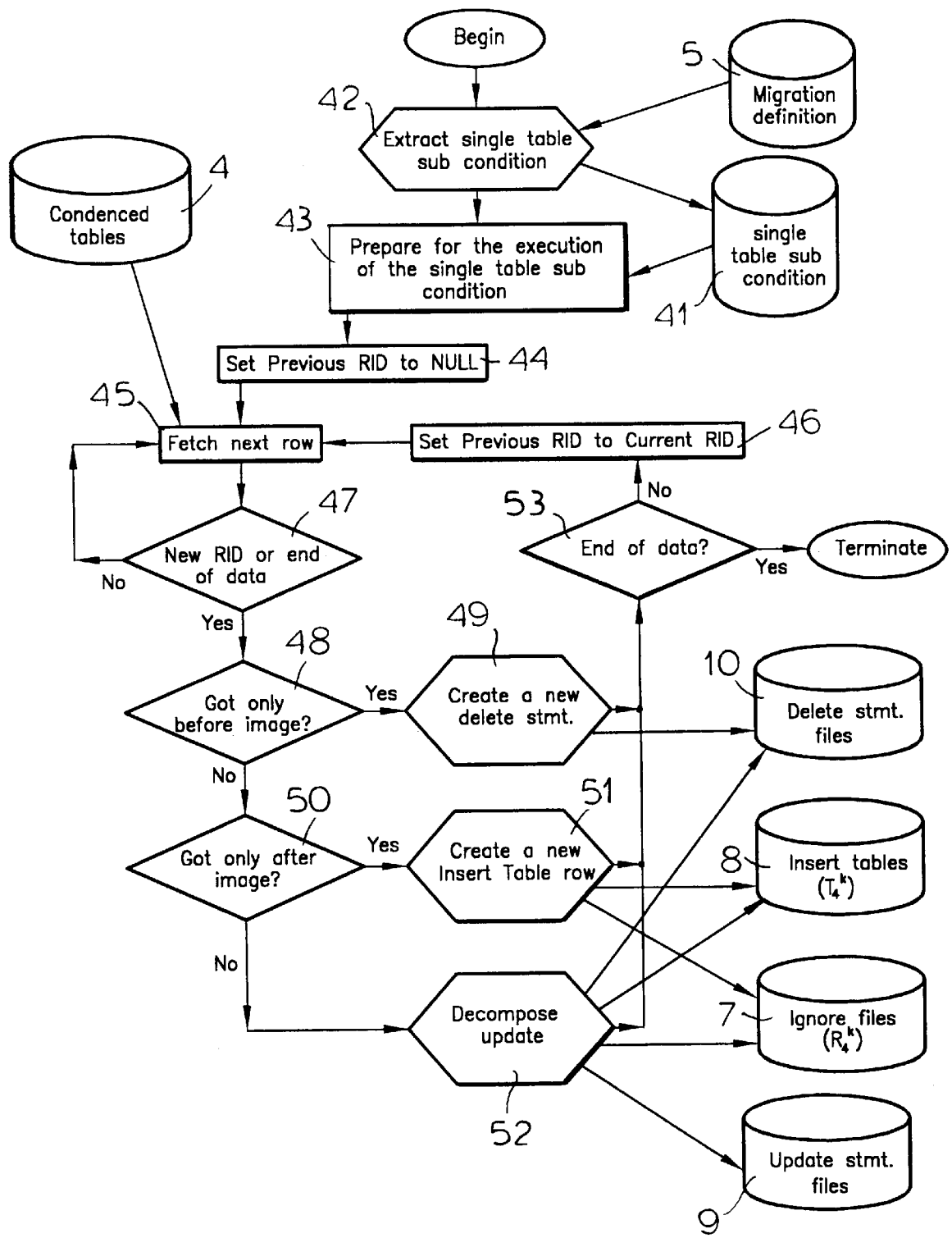

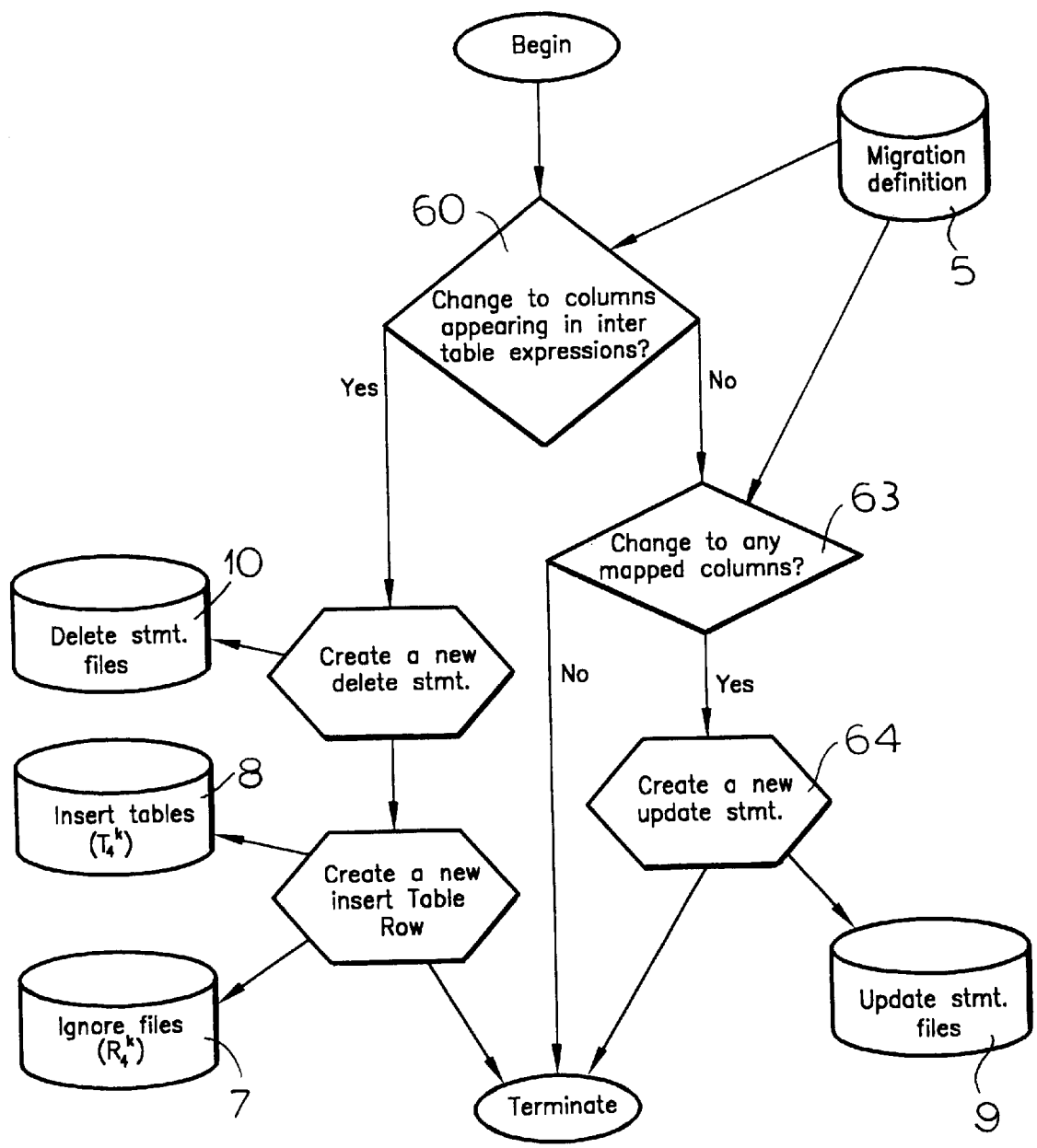
FIG.4 Decompose updates

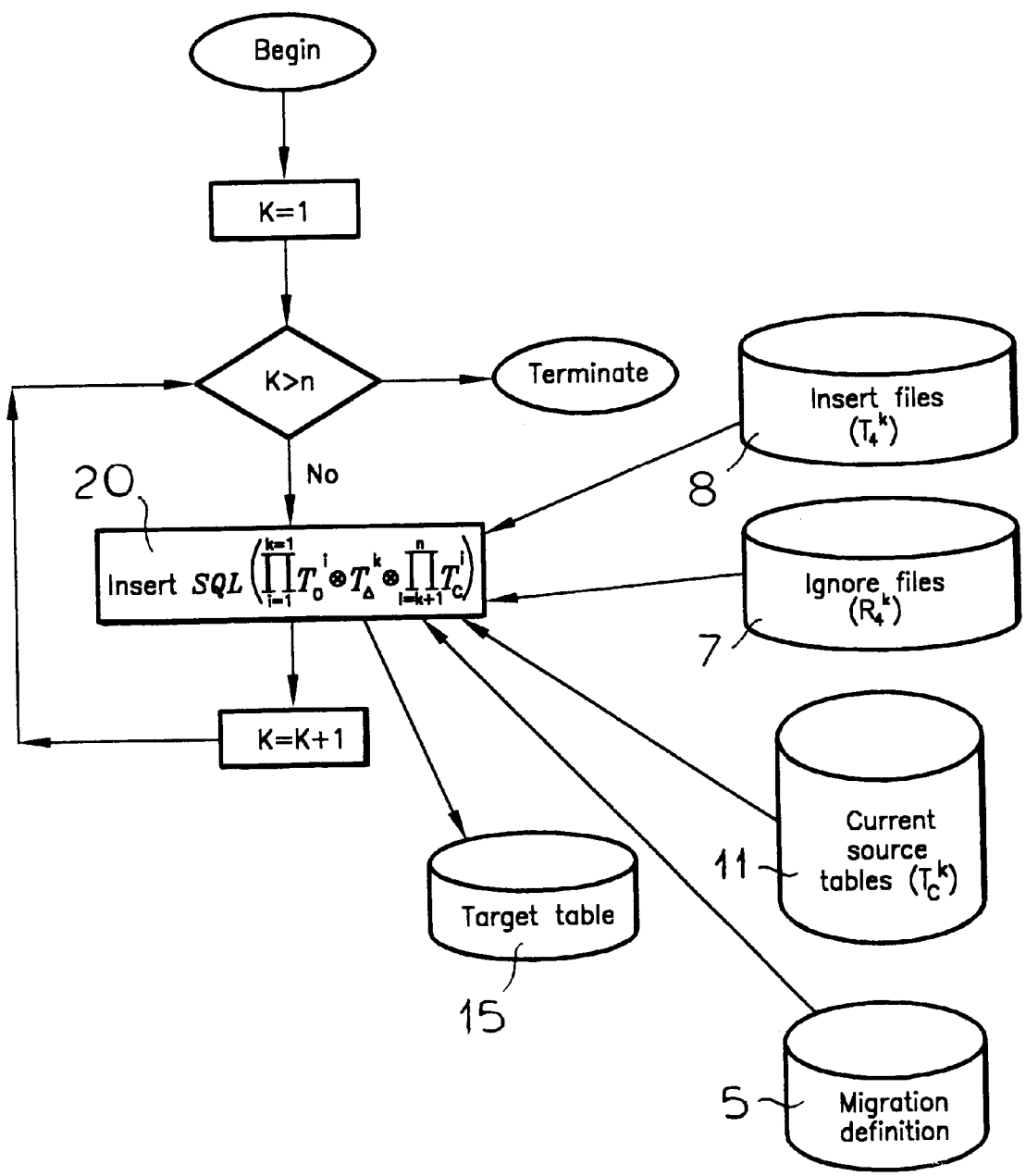
FIG.5 Join Insert and source tables and implement inserts

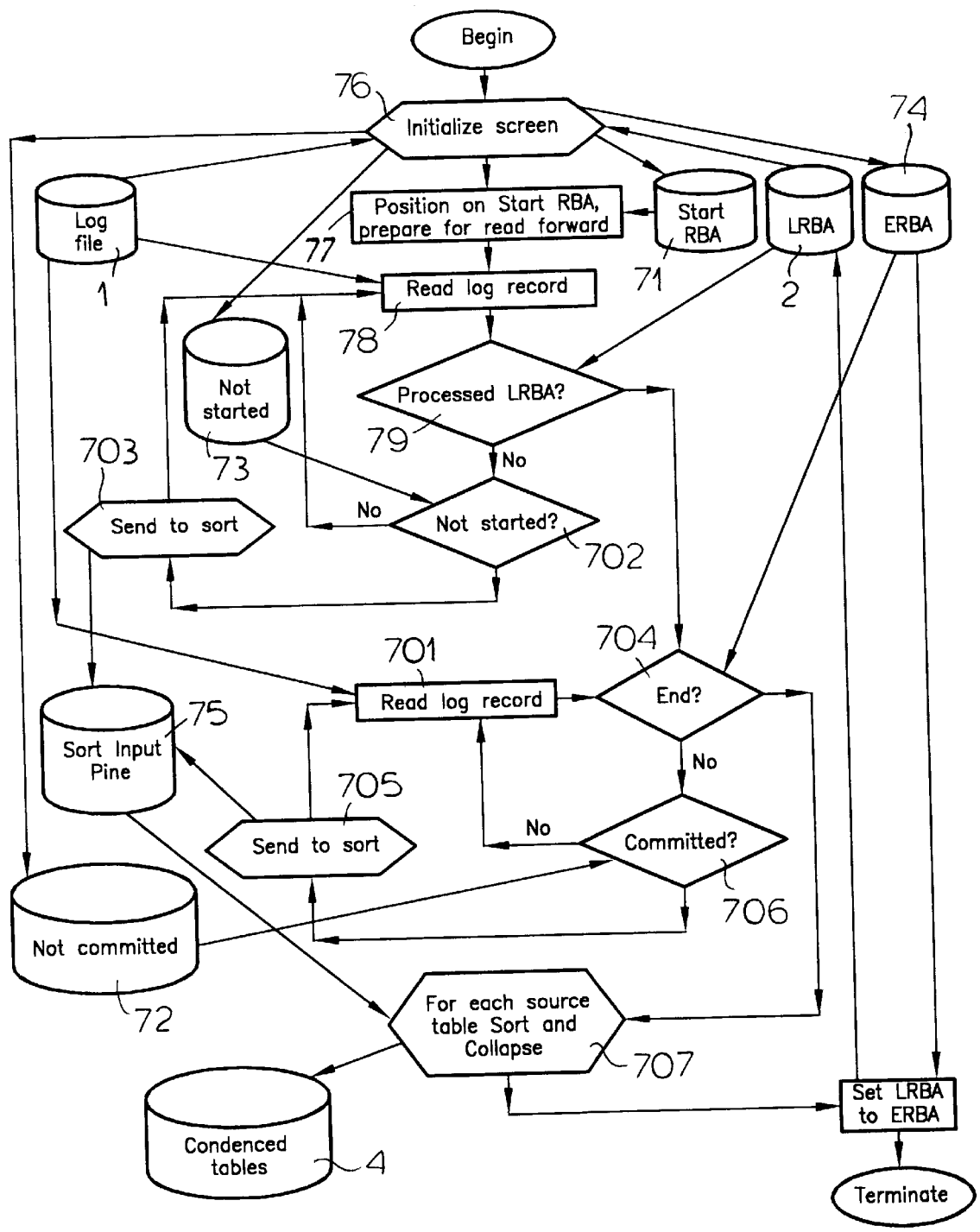
FIG.6 Screen and condense

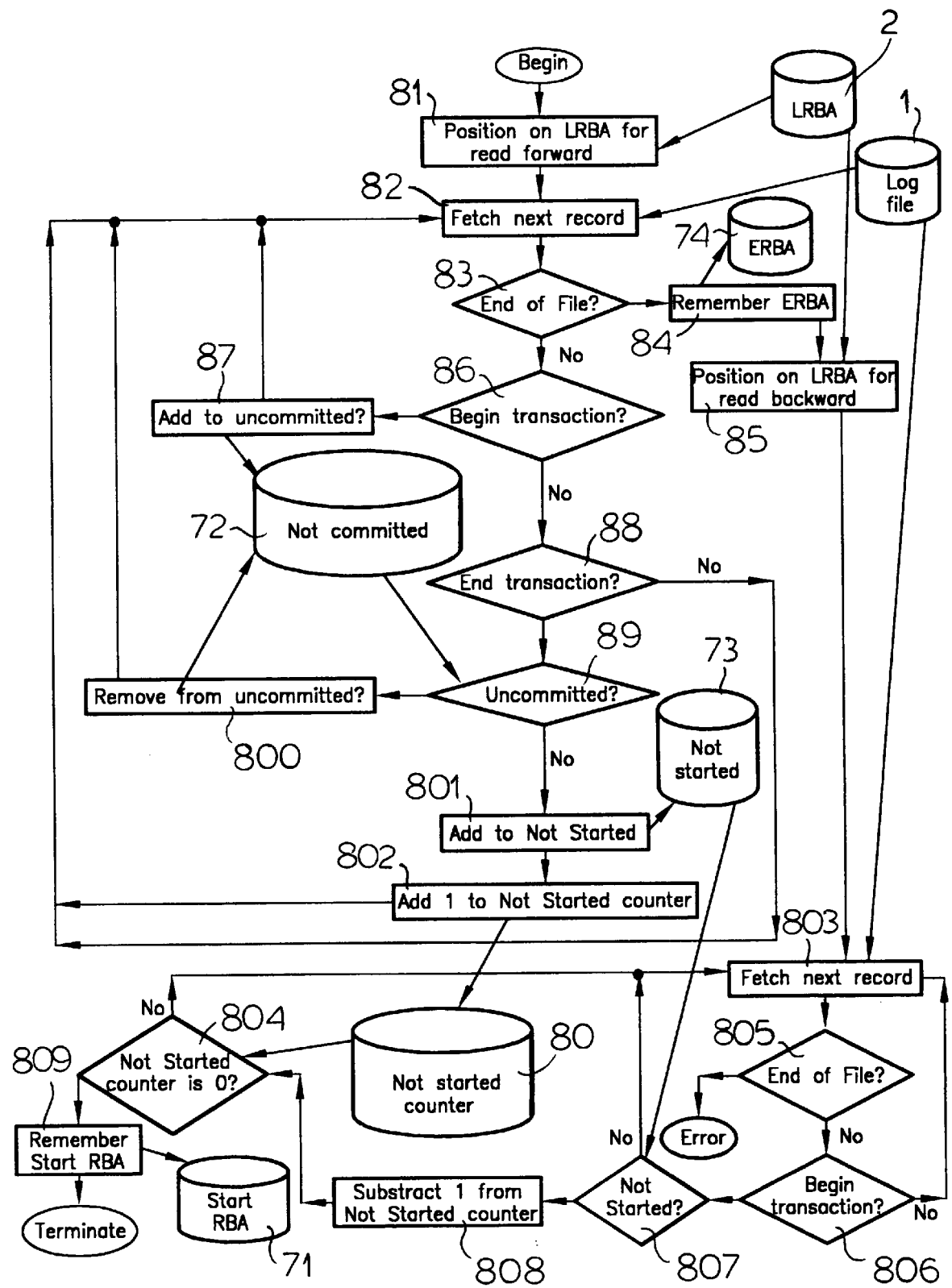
FIG.7 Initialize screen

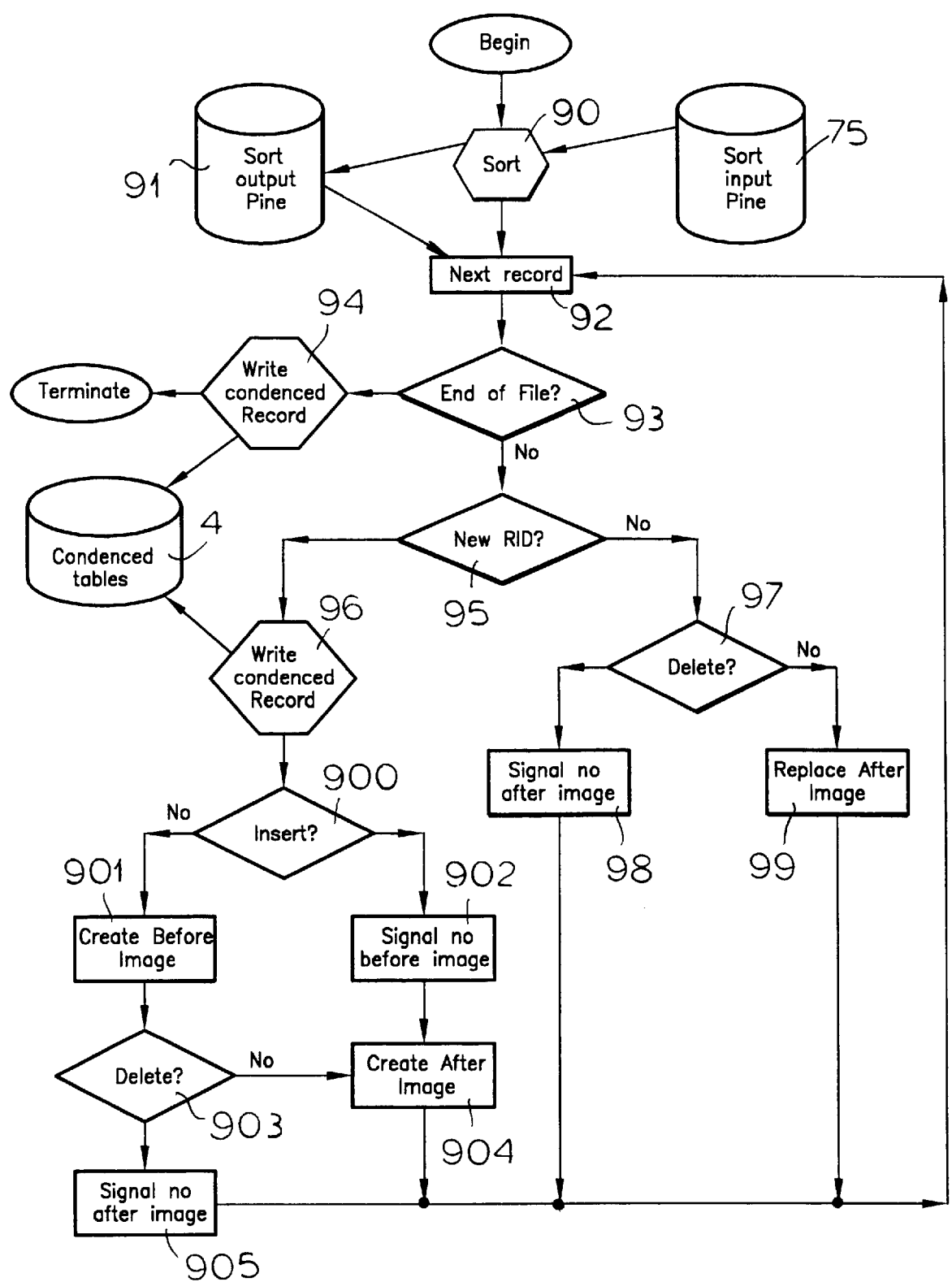
FIG.8 Sort and Collapse

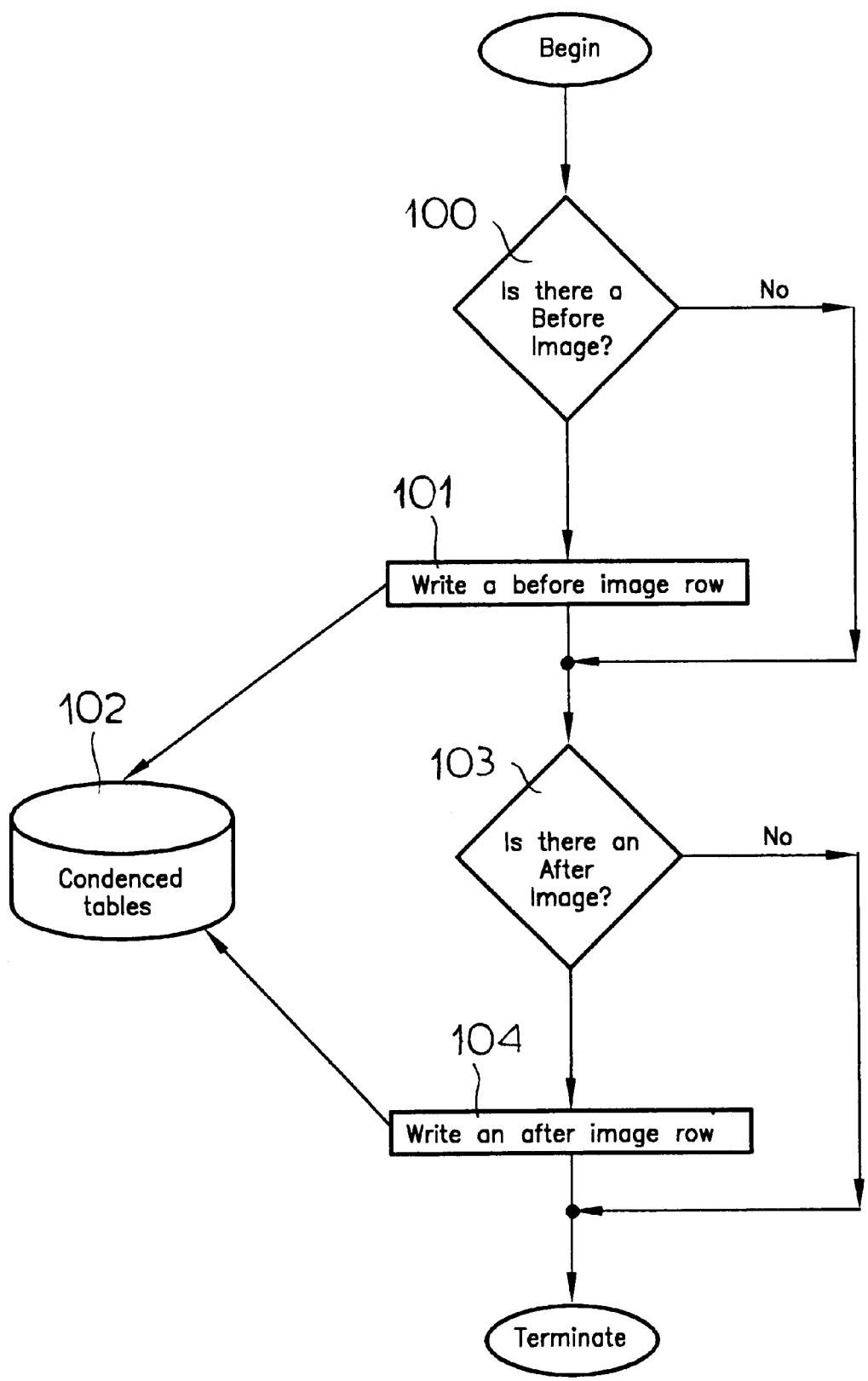
FIG.9 Write condenced record

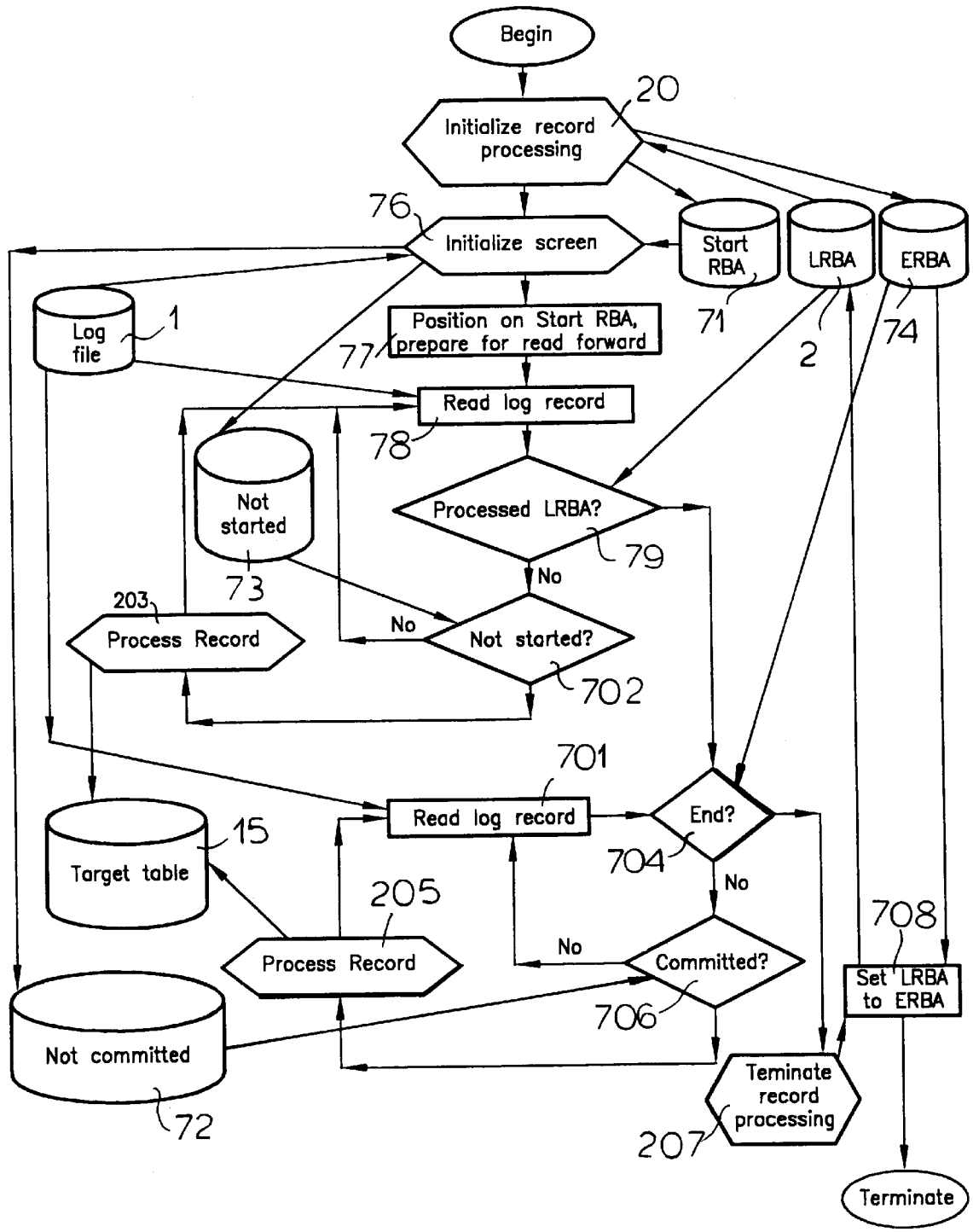
FIG.10 Direct ordered update

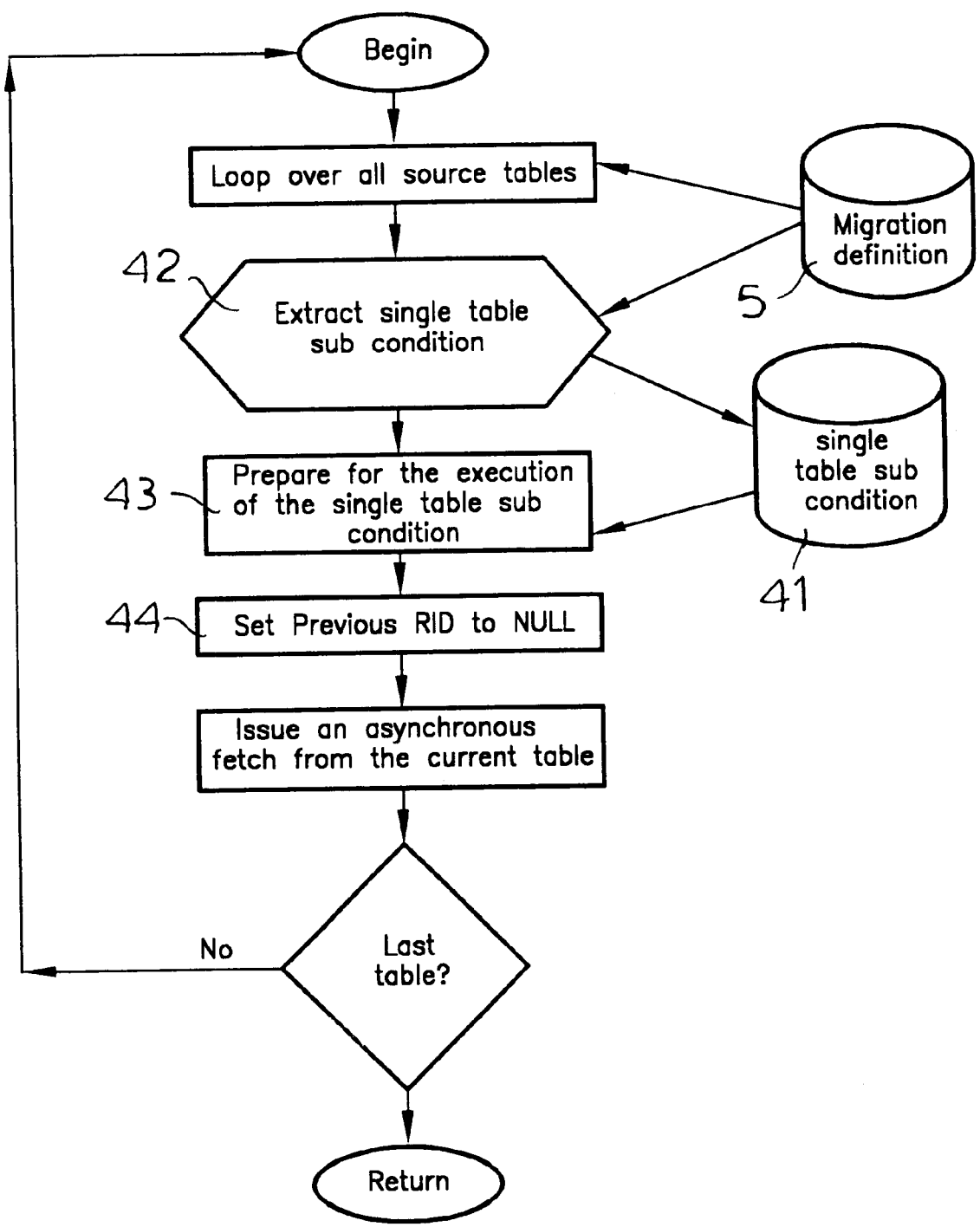
FIG.11 Initialize record processing

FIG.12 Process Record
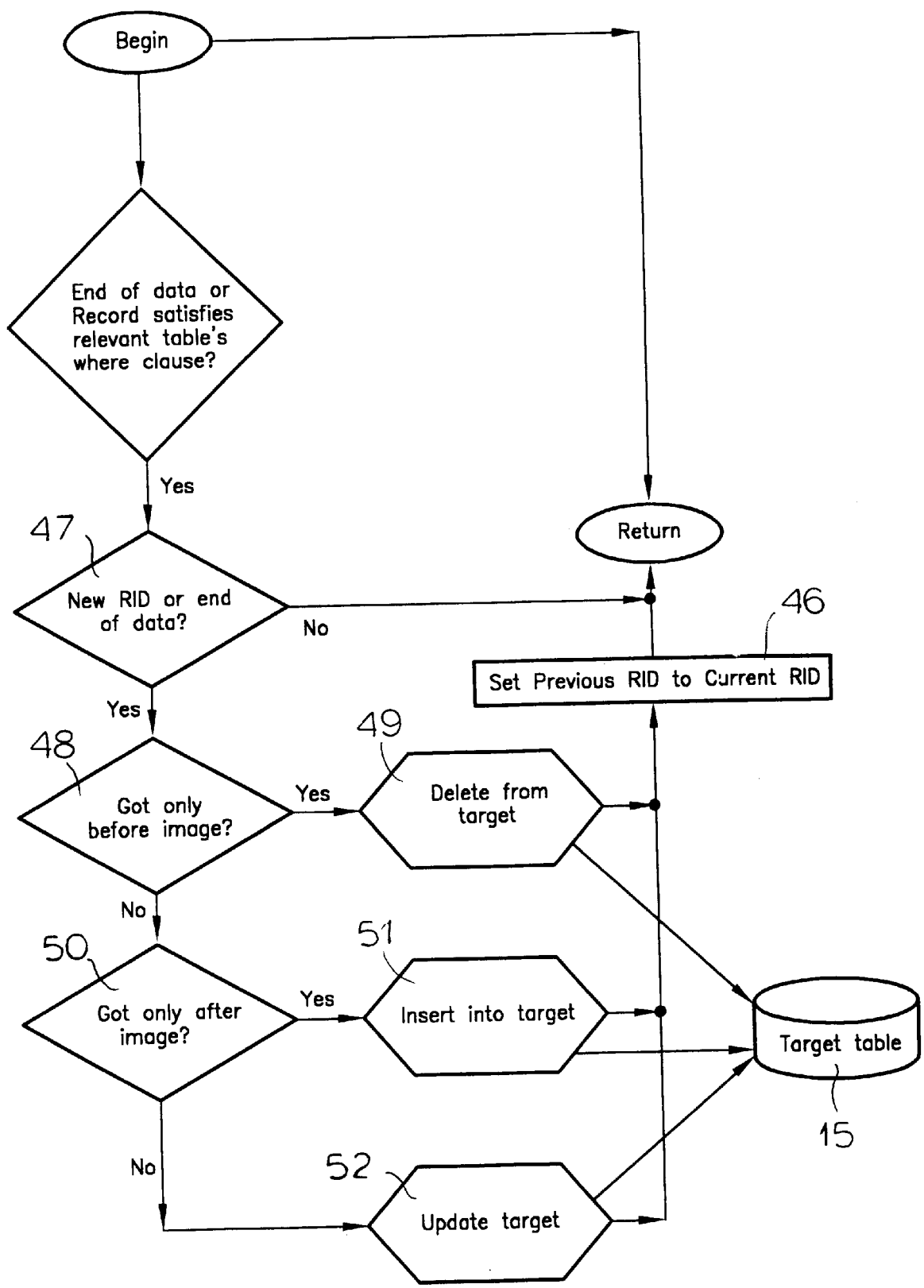

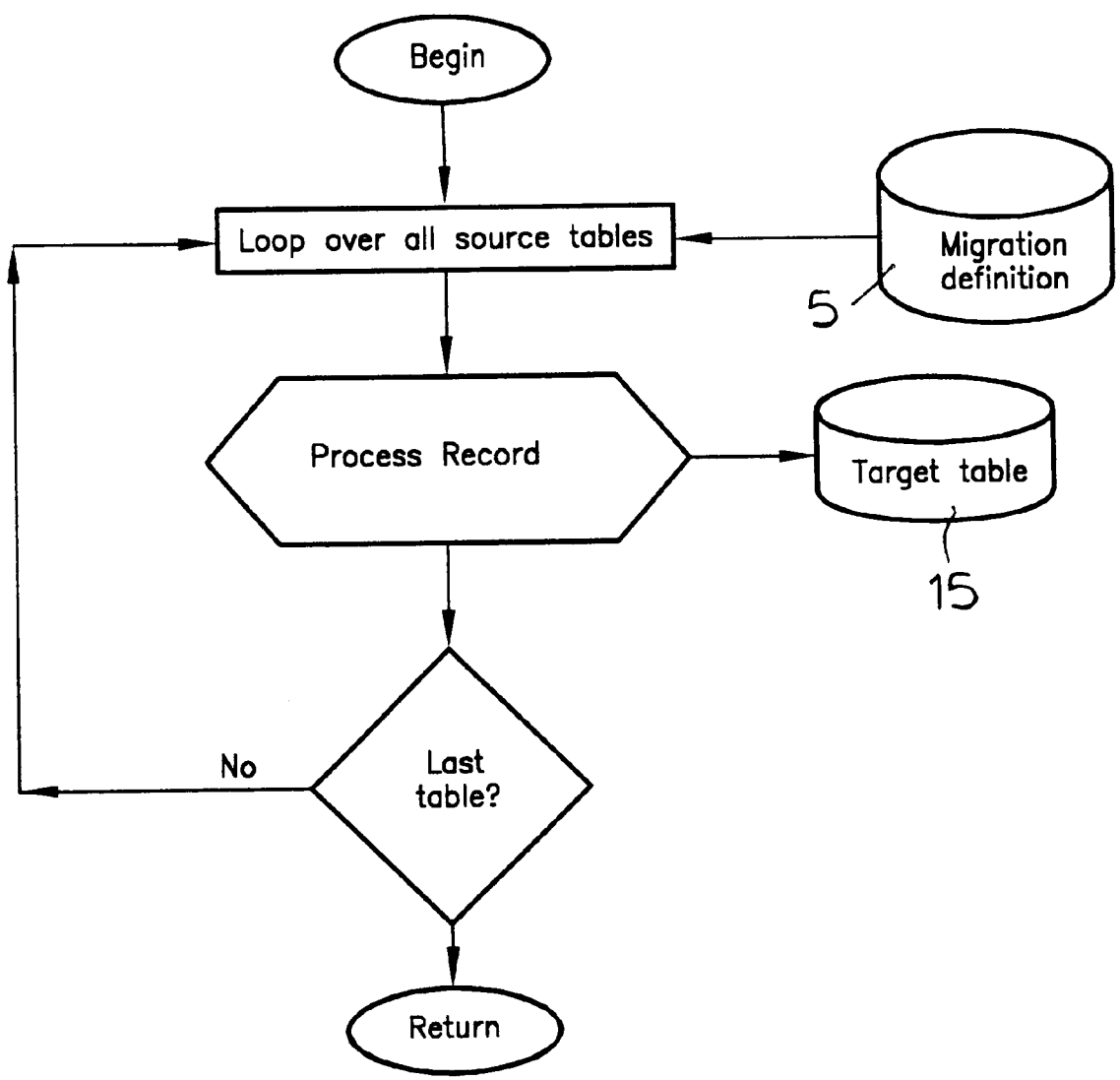
FIG.13 Terminate record processing

CHANGE PROPAGATION METHOD USING DBMS LOG FILES

FIELD OF THE INVENTION

Our present invention relates to change propagation processes and, more particularly, to the propagation of derivatives of changes made to a data base relying on information contained in a log file initiated by the data base management system.

BACKGROUND OF THE INVENTION

While there have been a variety of tools developed in recent years to support data replication and the propagation, in particular, of changes made in a data base relying on information contained in the log file created by the DBMS, there are problems which have been encountered. Earlier tools can support the replication of tables as such, starting with target tables which contain all of the rows and columns of an original table or only a subset of the rows and columns of an original table and terminating in migration processes which can exploit SQL capability including joins and aggregate functions in forming the result tables.

Such tools can be provided by DBMS vendors, usually for their own DB management systems, and by independent software developers, usually for a variety of data bases. Source tables may be large in some instances to the point that it may not be desirable to derive an entire target table whenever an updated copy is required, but rather to derive the target table only once and from that point on derive only changes. Such changes involve change propagation or change propagation processes and can be very complicated, especially where the replication relies on advanced SQL features like join and aggregate functions.

As a practical matter we are not aware of any simple and effective system which can support change propagation processes for migrations that use more than one source table instance for single table subcondition traceable migrations or for fixed environment traceable migrations or those which cannot rely on a stable version of a source table that may change, as these conditions are described below.

OBJECTS OF THE INVENTION

It is, therefore, the principal object of the present invention to provide an improved method of change propagation in a migration from at least one source table to a target table in a DBMS, utilizing the log file created by the DBMS whereby the drawbacks noted above are obviated.

Another object is to provide an improved change propagation process which is supported for migrations of the particular types outlined above for which each support has been lacking in earlier DBMS.

SUMMARY OF THE INVENTION

These objects and others which will become apparent hereinafter are attained, in accordance with the invention in a method of change propagation in a migration from at least one source table to a target table in a DBMS for a data base containing the source table and having a log in which each specific record has a data independent key enabling the finding of the specific record in that log and in which the data independent key is always larger for new records than for older records. This method is specifically intended for supporting the change propagation process for migrations that use more than one source table instance for single-table sub condition traceable migrations, for supporting the change propagation process for fixed environment traceable migrations without relying on a stable version of the source table that may change, and for supporting the change propagation process for single table instance migrations without relying on a stable version of the source table that may change.

The invention comprises the steps of:

(a) deriving from the log of the database containing the source table a last data-independent key representing an immediately-previous migration or change propagation process;

(b) for a particular migration definition and the respective last data-independent key derived in step (a), for a source table undergoing a change involving a migration, generating a condensed table containing at most two records for a record identifier of each data row which has changed in the source table after the completion of a previous migration or change propagation process, the two records being selected from before and after images of the data row which has changed in the source table or from a before image of a first pair of the images and an after image of a last pair of the images where the same data row is changed a number of times and a respective pair of images are formed with each change;

(c) for each source table appearing in the migration definition, eliminating redundant changes and from the migration definition and the condensed table, generating a file containing delete statements, a file containing update statements, an insert table and an ignore file containing instructions to ignore specific rows in a table;

(d) thereafter:

(d1) implementing deletes based upon the file containing delete statements and updating the target table correspondingly, (d2) implementing updates based upon the file containing update statements and updating the target table correspondingly, (d3) where a single source table is involved in the migration definition and the migration definition does not involve an SQL join step, implementing insert commands contained in the insert table and updating the target table correspondingly, and (d4) where a plurality of source tables are involved in the migration definition and the migration definition includes an SQL join step, joining each insert table generated from one of the plurality of source tables with at least parts of the other source tables of the plurality of source tables based upon the migration definition, the ignore file, the respective source table and the insert table to generate a respective insert statement file; and (e) updating the target table based upon commands in the insert statement file.

Preferably in step (d4), for source tables $T_1, T_2, T_3, \ldots$ having respective insert tables $i_1, i_2, i_3, \ldots$ each insert table $i_1, i_2, i_3, \ldots$ is iteratively joined to that portion of the other source tables $T_2, T_3, \ldots, T_1, T_3, \ldots, T_1, T_2, \ldots$ ignoring rows in response to a respective instruction of the respective ignore file.

BRIEF DESCRIPTION OF THE DRAWING

The above and other objects, features, and advantages will become more readily apparent from the following description, reference being made to the accompanying drawing in which:

FIG. 3 is a diagram of the "Eliminate Redundant Changes" procedure at block 6 of FIG. 2;

FIG. 4 is a diagram of the "Decompose Update" operations represented at block 52 in FIG. 3;

FIG. 5 is a diagram of the "Join Insert and Source Tables" and the implement inserts operation of FIG. 2;

FIG. 6 is a diagram of the algorithms for the "Screen and Condense" procedure referred to in connection with FIG. 2;

FIG. 7 is a diagram of the algorithm for the initialized screen procedure referred to in FIG. 6;

FIG. 8 is a diagram of the "Sort and Collapse" algorithm of FIG. 6;

FIG. 9 is an algorithm diagram of the "Write and Condensed Record" feature of FIG. 8;

FIG. 10 is a diagram which describes direct ordered update;

FIG. 11 describes the initialize record processing procedure referred to in FIG. 10;

FIG. 12 is a diagram which describes the process record procedure referred to in FIG. 10; and FIG. 13 is a diagram which describes the terminate record processing procedure referred to in FIG. 10.

SPECIFIC DESCRIPTION

Figure 1:
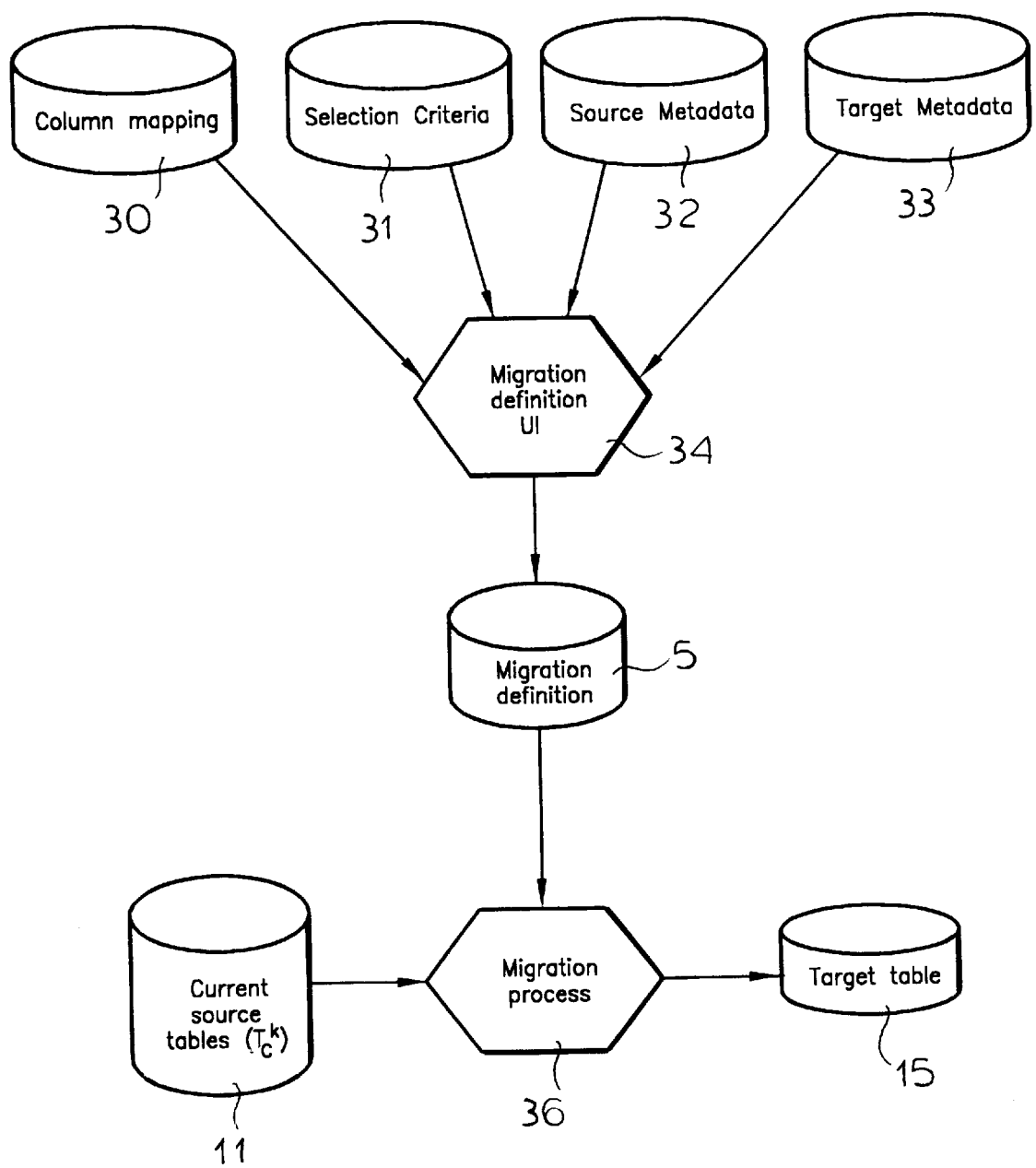
FIG. 1 is a representation of a regular migration process (prior art) providing a context for the present invention.

Definition and Notation:

Stable Version of a Table

A version of the table that is consistent (does not reflect results of uncommitted transactions) and complete (all the data is on the disk and there is no need to access the DBMS's cache buffers to retrieve it). A stable version can be the table itself, a hardware copy of the table or even a remote copy of the table that is maintained by a change propagation process.

Before Image

A DBMS's table's row as it was just before a given update operation.

After Image

A DBMS's table's row as it was just after a given update operation.

Migration

A process that migrates data from a plurality of tables, possibly belonging to a plurality of DBMS's, to a target table in some possibly different DBMS.

A migration is specified by the definition of the target table, the source tables, the condition defining which combinations of rows of these tables should be migrated, the order in which these rows should be entered into the target table and the mapping of expressions relying on the columns of the source tables to their target columns in the target table.

It is convenient to describe the definition of a migration in an augmented SQL syntax as in the following example:

SELECT T1.X→R, T2.Y→S, T1.W+T2.Z→Q FROM T1, T2→TT WHERE T1.A=T2.B AND T1.C<12;

which defines a migration that maps the column T1.X to TT.R, T2.Y to TT.S and the result of the computation T1.W+T2.Z to TT.Q, for all the rows resulting from the join of T1 and T2, obeying the condition T1.A=T2.B AND T1.C<12 "where" clause.

In view of the above notation, we speak of a migration's "where" clause to mean the "where" clause in the migration's SQL like definition.

The migration's "where" clause is the condition defining which combinations of source table's rows should be migrated.

Inter Table Expression

A simple SQL expression in the above notation (a function call, an arithmetic, date or string operation or a comparison operation) which involves columns from more than one source table instance.

Single Table Sub Condition

A sub condition in the "where" clause of a migration, defined in terms of a single source table, which is in an AND relation with the other parts of the condition.

Traceable Migrations

A migration is traceable with respect to a given table if the rows in the target table, when combined with the column mapping definition and the migration's "where" clause contain enough information to uniquely identify the given source table row from which they stem.

Single Table Sub Condition Traceable Migrations

A migration is single table sub condition traceable with respect to a given table if the rows in the target table, when combined with the column mapping definition and a single table sub condition defined for that table in the migration's where clause contain enough information to uniquely identify the given source table rows from which they stem. Note that an interesting special case of Single Table Sub Condition traceable migrations are the migrations in which the rows in the target table, when combined with the column mapping definition provide all that is needed for traceability, such migrations will be termed condition independent traceable migrations or CIT.

Fixed Environment Traceable Migrations

A migration will be said to be Fixed Environment Traceable if it is traceable and only one of its source tables may change.

This definition is useful since there are cases where migrations do not enjoy any of the above special traceability properties, but are still traceable and because there is a relatively easy way to handle these migrations when only one of the source tables may change.

A very common example will probably be the case where the user defines a translation table that decodes or translates the source values into equivalent values that should replace them in the target. Take, for example the case of the migration SELECT T1.A→X, T2.B→Y FROM T1, T2→TT WHERE T1.D=T2.E;

When A|D is a unique key of T1 and only T1 can change.

This may be a case where we created T2 just to support the replacement of T1.D by T2.B and where, hence, the appearance of T2.B is equivalent to the appearance of T1.D which would have made the migration CIT.

Note that although this migration is traceable, it is not single table sub condition traceable.

Almost Fixed Environment Traceable

Cases where some of the source tables change very infrequently. We may then use the methods we devise for Fixed Environment Traceable Migrations only in the cases where only one table changed, and perform a full migration in the rare cases where more than one table changed.

SQL Engine

A software tool that enables SQL queries over any combination of data sources by way of data source specific drivers that provide the SQL engine with the metadata and basic data access capabilities like direct access and sequential scan.

ISG's Navigator, DHARMA, Informix's Universal server, Sybase's OmniSQL and IBM's DataJoiner are all examples of SQL Engines.

The environment we are basing this disclosure on is supposed to be equipped with such a tool or with a home grown SQL enabling tool that is sufficiently flexible for the definition of the new data sources appearing in the sequel.

The Migration's Select Statement

This is the formulation of the migration's definition in the above notation, without the target mapping information.

The SQL Statement of the Migration

SELECT T1.X→R, T2.Y→S, T1.W+T2.Z→Q FROM T1, T2→TT WHERE T1.A=T2.B AND T1.C<12;

Would Be

SELECT T1.X, T2.Y, T1.W+T2.Z FROM T1, T2 WHERE T1.A=T2.B AND T1.C<12;

Parametric Expression of an SQL Select Statement

For a given SQL select statement we need to be able to refer to the same SQL statement with different tables.

We'll use the following notation for this purpose: $SQL(T_1 \otimes T_2 \otimes T_3 \otimes T_4 \ldots \otimes Tn)$ where the SQL statement is deducible from the context and $T_1, T_2, \ldots Tn$ are the tables.

We'll also use the shorthand $$\prod_{i=1}^{n} T_i$$

to represent $T_1 \otimes T_2 \otimes T_3 \otimes T_4 \ldots \otimes Tn$

DETAILED DESCRIPTION

FIG. 1 describes a regular migration process. It is provided only to illustrate the context of the current invention.

In this figure the various inputs to the migration definitions are collected by the Migration Definition User Interface 34 to create the migration definitions 5.

These inputs consist of the target table's metadata 33, the source table's metadata (Source MetaData 32—there may be more than one source table), the selection criteria 31 defining which combinations of rows from the source tables will be reflected in the target table, and the column mapping 30 defining the data that should be mapped to specified columns in the target table. The data values mapped to the specified target columns will generally be values coming from the source tables or functions of such values, but they may also be constants or source independent functions (like the current date).

The selection criteria 31 (which may also be void) will be formulated as the Where Clause of an SQL statement extracting data from the selected source tables.

The migration definition file 5 then serves as an input to the Migration Process, which uses it, along with the source related part of the column mapping 30 to create an SQL statement extracting data from the source tables.

The Migration process 5 then inserts the extracted data into the target table 15.

Figure 2:
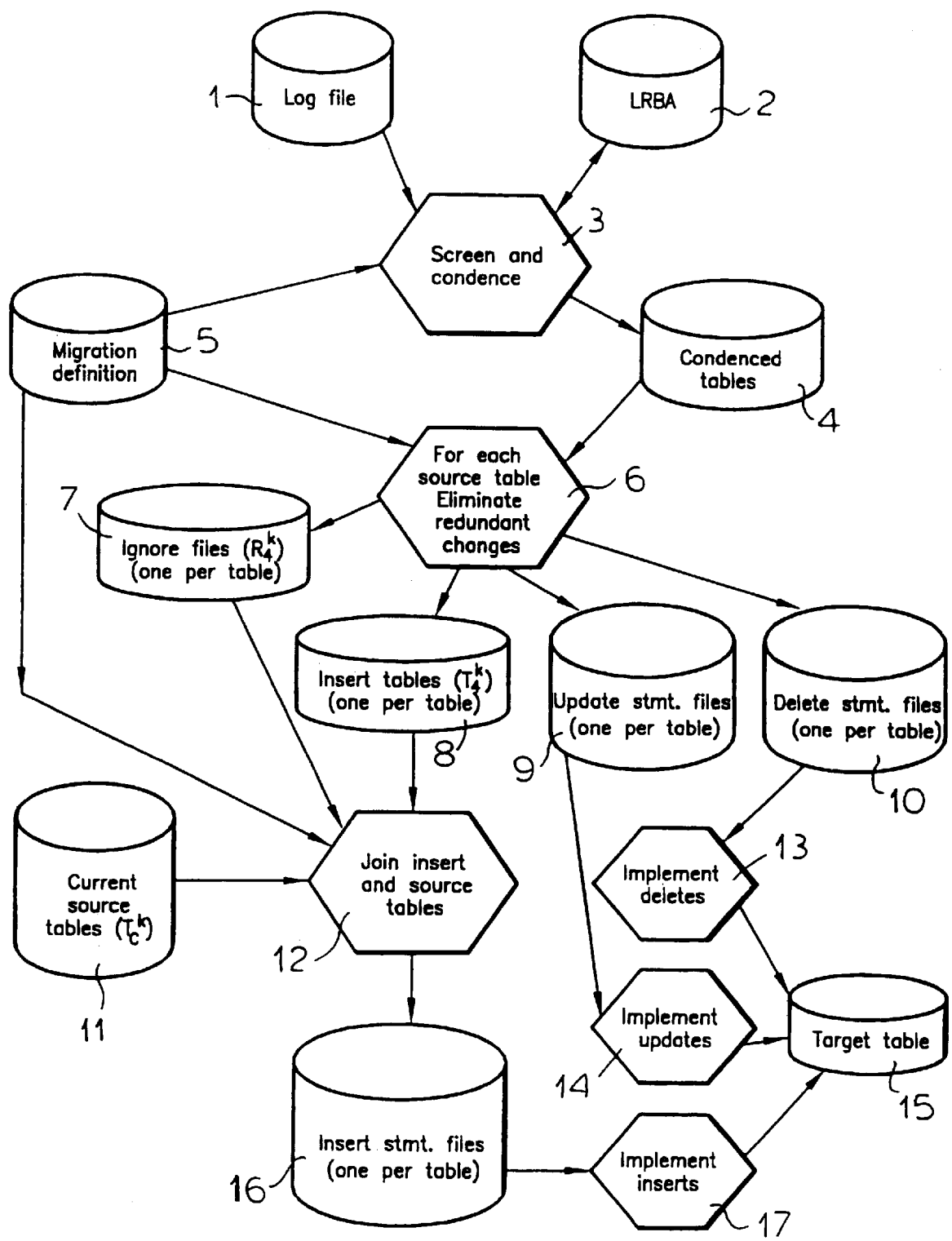
FIG. 2 is a diagram similar to FIG. 1 illustrating the entire change propagation process of the invention.

FIG. 2 depicts a high level view of the whole change propagation algorithm of the invention.

The change propagation algorithm is related to a migration definition.

It is intended to enable the propagation of the derivatives of changes to the source tables of a migration, to the target table, avoiding the need to rescan the source tables and recreate the target table.

This algorithm will create the expected results in all the cases where the migration is single table sub condition traceable with respect to all the source tables that have changed since the last execution of this migration.

This algorithm can be activated for a plurality of migrations simultaneously, with a single scan of the log.

Before the algorithm is started, whenever a migration containing a "join" expression is involved, if the migration is not fixed environment traceable, a stable version of the source tables should be created.

Whenever in the description of this figure, the term "source tables" is mentioned in the sequel, it should be understood that unless no join is involved, the stable version of these source tables is meant. This algorithm has four main inputs—The log file 1, the file containing the last RBA handled by the previous migration 2, the migration definition 5 and the source tables in their current state 11.

As will become clearer in the sequel, not all these inputs are necessarily used.

The first step in this algorithm is the activation of the procedure Screen and Condense 3 described in detail in FIG. 6.

The output of this stage contains for each table a condensed table 4 containing at most two records for each RID of a row that has changed in that table. Normally, one of these records represents the "before image" of the relevant row, while the other represents the "after image" of that row. There is no "before image" for rows that have first been inserted into the database after the previous activation of the current migration and there is no "after image" for rows that have been deleted (and not recreated) since the previous activation of the current migration.

These condensed tables 4 serve as one of the inputs to the "eliminate redundant changes" step 6 which is performed for each of the source tables appearing in the migration definition 5. This step is fully described in FIG. 3. Its purpose is to use the migration's definition 5 in order to transform the condensed tables 4 into files containing delete statements 10, files containing update statements 9, insert tables 8 and ignore files 7 containing the source tables RIDs of the rows from which the rows of the insert tables 8 have been derived. The meaning of the insert tables 8 and the ignore files 7 will be further explained in the detailed description of their creation through the "eliminate redundant changes" process detailed in FIG. 3 and their use in the process "join insert and source tables" 12 detailed in FIG. 5.

When the elimination of redundant changes 6 is completed and its output files created we perform the following steps:

Implement deletes 13 using the "Delete Stmt. Files" 10 as input and updating the target table 15.

Implement updates 14 using the "Update Stmt. Files" 9 as input and updating the target table 15.

The step performing the "Join insert and source tables" 12 may be performed simultaneously with the above two steps or it may be skipped altogether in the case of a single table with no join.

When this step is skipped, the "insert tables" 8 will contain the insert commands themselves and will be used by the "Implement Inserts" step 17 instead of the Insert Stmt. Files 16.

At any rate, steps 13 and 14 must precede the "implement Inserts" step 17 and so must step 12 whenever it is performed.

FIG. 3 describes the "Eliminate redundant Changes" procedure referred to in 6 FIG. 2.

This step is performed for each source table appearing in the migration definition 5.

The first step taken by this procedure is the extraction in 42 of a single table sub condition 41 for the current source table. The way to perform this task will differ, depending on the way the migration is described in the migration definition file 5. The easiest way to implement it is to require these sub conditions to be explicitly defined in the migration definition file.

The disk file symbol used in this figure to designate the single table sub condition 41 should not be taken literally; the preferred embodiment will keep them in main storage.

Action rectangle 43 is meant to describe all the preparations that need to be done to set the SQL engine mechanism for the extraction of rows in which the current single table sub condition 41 is satisfied, from the condensed tables 4. In ODBC terminology, this means invoking the SQLPrepare and SQLExec functions.

The table that will be scanned by the SQL engine, as a result of these preparations will be the condensed table 4 that represents the changes in the current table.

The structure of a row in this table is identical to the structure of the rows in the original table with two additional columns: one we'll term "rid", containing the RID of the current row and the other, termed "ba" will contain the character 'A' for after images and 'B' for before images. This table is ordered by RID.

The SQL statement that will be used to scan this table will be of the form

SELECT v1, v2, . . . vk FROM table WHERE condition;

Where the terms v1, v2, . . . vk are all the expressions that are based on the current table, appearing in the mapping of the migration and the condition is the current table's single table sub condition 41.

We may add to this SQL statement the text "ORDER BY rid" but it is not needed since this is the natural order of the condensed table 4.

The loop beginning on action rectangle 45 is a loop that handles each fetched row only when a row with a different RID is fetched or the end of the table is reached. This is the moment we can tell whether the condensed table 4 after the filtering defined by the single table sub condition 41 contains only the "before image," of a given RID, only its "after image," or both. This way of operation is governed by the decision depicted in 47.

In decision 48 we check whether, for the previous RID, we only got a "before image." If this is the case, the derivatives of this row should be deleted from the target table. This is why subroutine 49 creates a new delete statement. In the case of single table sub condition traceable migrations, the delete statement created in 49 has the following form:

DELETE FROM table WHERE c1=v1 and c2=v2 and . . . and cn=vn.

in this delete statement c1, c2 . . . cn are the columns in the target table containing values that stem from the current source table and v1, v2 . . . , vn are the corresponding values extracted by the SQL engine from the "before image." The procedure for creating the appropriate delete statements in the case of a migration that is not single table sub condition traceable but is fixed environment traceable is different. In this case, delete statements are created on a target row by target row basis, through a special join between the "before image" of the row that has been deleted and the source database tables that cannot change, using the migration's select statement.

For every row selected by this join, we create the delete statement, with a "where" clause of the form "where C1=V1 and C2=V2 and . . . and CN=VN", in which C1, C2, . . . CN are the target columns mapped from all the source tables, and the V1, V2, . . . , VN are the values the migration maps to these columns taken from the result of the select statement defining the above special join.

In this figure, for clarity and uniformity, the delete statements are depicted as written into delete statement files 10 to be later processed, as shown in FIG. 2 subroutine 13 to produce an effect on the target table 15. It should be noted, however, that the delete statements can be executed immediately upon creation and there is no need to collect them in a file for later execution.

In decision 50 we verify whether only an "after image" has been fetched for the previous RID.

If this is the case, we create a new row in the insert table 51.

The creation of a new row in the insert table, in the case of a migration in which the "where" clause contains a join operation, comprises two activities. The first activity is to add to the current table's insert table 8 a row that is identical to the row that has been inserted into the source table, augmented by an additional column containing its RID in the source table. The second activity is to add that same RID to the current table's ignore file 7. The purpose of these files will be explained in the description of FIG. 5. In the case of a migration with no join, there is no need to create the Ignore file 7.

When both "before" and "after" images are fetched for a given RID, we decide whether to decompose them into a delete statement and a row in the insert table or create an update statement. This is done in the Decompose update procedure 52 described in detail in FIG. 4.

FIG. 4 depicts the Decompose Updates procedure mentioned above.

The first decision we take in 60 is whether the update request should be decomposed into a delete statement and an insert statement or implemented as a single update statement. This decision is based on the participation of the columns that have changed in inter table expressions.

If any of the updated columns appears in such an expression, the update operation is split into a delete operation and an insert operation. The delete operation is created in subroutine 61 as in FIG. 3. subroutine 49. The insert is performed in subroutine 62, as in FIG. 3, subroutine 51. If none of the updated columns appears in an inter table expression, we need not split the update operation. We can, however, ignore it.

The decision whether or not to ignore the update operation is taken in 63 where we ask if any of the updated columns is mapped to the target table.

If none of the updated columns is mapped into the target table, we can ignore this update request.

If, however, any of the updated columns is mapped to the target table, an update command should be generated.

In single table subcondition traceable migrations, this update command will have the following form:

UPDATE table SET cc1=nv1, cc2=nv2, . . . , cck=nvk
WHERE tc1=ov1 and tc2=ov2 and . . . and tcj=ovj;

In the above statement, cc1, cc2 . . . cck stand for the names of the target table columns that are mapped from the source table columns that have changed, nv1, nv2, . . . , nvk are the new values that have been assigned to these columns, as extracted from the row representing the "after image," tc1, tc2 . . . tcj are all the columns in the target table containing values that stem from the current source table and ov1, ov2 . . . , ovj are the corresponding values extracted by the SQL engine from the "before image."

Note that some column names appearing in cc1, cc2, . . . , cck may be identical to some of those appearing in tc1, tc2, . . . tcj.

In fixed environment traceable migrations that are not single table sub condition traceable we create the update statements in a different manner.

In this case, update statements are created on a target row by target row basis, through a special join between the "before image" of the row that has been updated and the source database tables that cannot change, using the migration's select statement.

For every row selected by this join, we create the update statement, with a "where" clause of the form "where C1=V1 and C2=V2 and . . . and CN=VN", in which C1, C2, . . . CN are the target columns mapped from all the source tables, and the V1, V2 . . . , VN are the values the migration maps to these columns taken from the result of the select statement defining the above special join.

The values to be set to the target columns by the update statements are taken from the after image of the last reference to each RID.

FIG. 5 describes the insertion of new rows into the target table (after all the delete and update operations have been performed, and the creation of the insert tables $T^k_A$ (8) and ignore files $R^k_A$ (7) has been completed for all k's from 1 to n). This activity corresponds to the procedure Join Insert and source tables (12) described in FIG. 2 and to the procedure Implement Inserts (17) in the same figure.

The term $T^i_o$ appearing in this figure refers to a virtual table simulated for the SQL Engine by a driver that reads the rows of the source tables in their current state $T^i_c$ (11), but skips those whose RID appears in the ignore files $R^i_A$ (7).

In the interpretation of this figure, Cartesian Products having a lower bound which is higher than the upper bound should be ignored.

$$\text{The term } SQL\left(\prod_{i=1}^{k-1} T^i_O \otimes T^k_\Delta \otimes \prod_{i=k+1}^{n} T^i_C\right)$$

stands for the result of the application of the SQL Engine, with the migration's original select statement, but with the tables appearing in the parenthesis instead of those originally referred to in the migration's definition.

In other words, the action rectangle 20 in the first iteration stands for

Insert $SQL(T^1_A \otimes T^2_c \otimes T^3_c \otimes \ldots \otimes T^R_c)$ into the target table Then, in the second iteration it stands for Insert $SQL(T^1_0 \otimes T^2_A \otimes T^3_{c} \otimes T^4_c \ldots \otimes T^{Rc})$ into the target table Then, in the third iteration it stands for Insert $SQL(T^1_0 \otimes T^2_0 \otimes T^3_A \otimes T^4_c \ldots \otimes T^{Rc})$ into the target table Then, in the k'th iteration, for all k's where k>1 and k<n it stands for Insert $SQL(T^1_0 \otimes T^2_0 \otimes \ldots \otimes T^{k-1}_0 \otimes T^k_A \otimes T^{k+1}_c \otimes T^{k+2}_c \ldots \otimes T^R_c)$ into the target table And then, in the n'th iteration, it stands for Insert $SQL(T^1_0 \otimes T^2_0 \otimes \ldots \otimes T^{n-1}_0 \otimes T^R_A)$ into the target table Note that although this activity is described as a sequential loop, all the iterations may, in fact, be performed in parallel.

FIG. 6 illustrates the Screen and Condense procedure initially referred to as a subroutine (3) in FIG. 2. The first step of the Screen and Condense procedure is the invocation of the Initialize Screen procedure 76 that is detailed in FIG. 7. This subroutine takes the log file (1) and LRBA (2)—the last log RBA handled by the previous migration or change propagation process—and creates the following outputs:

ERBA 74—the last RBA the current change propagation process will handle.

Start RBA—the log RBA of the first log record this change propagation process has to read. The Not Started 73 list of transactions that have started before the previous change propagation process terminated but only terminated after it did.

The Not Committed 72 list of transactions that started after the previous change propagation process terminated but did not terminate yet.

The action rectangle 77 states "Position on Start RBA". This is not really an action that has to be taken. It is a side effect of the Initialize Screen 76 subroutine. The real action that has to be performed is to prepare for forward read since Initialize Screen 76 arrived to this position by reading backwards. In action rectangle 78 we repeatedly read log (1) records until we reach LRBA.

Before we discover in decision 79 that LRBA has been processed, we send to the sort process 703 all the records belonging to transactions that appear in the Not Started 73 list.

At this point it should be clarified that both procedures Send to Sort 703 and Sort and Collapse 707 appearing in this figure are, in fact, two intimately connected subroutines that cooperate as a "Before Exit" and "After Exit" of a sort process (like what IBM mainframe users know as E15 and E35 exits of IBM's IEBSORT).

It should also be mentioned that the send to sort 703 and 705 creates a different sort input pipe 75 for each table.

Once we process LRBA, we read the remaining part of the log 1 in action rectangle 701.

In this loop we send to sort 705 all the records belonging to transactions that do not appear in the Not Committed 72 list.

When we discover, in decision 704 that all the log records we intended to read have been read, we invoke the Sort and Collapse 707 subroutine which is further detailed in FIG. 8 that creates the condensed tables 4.

Once Sort and Collapse 707 terminates, we put in LRBA the value of ERBA to signal the next change propagation process that this is the point we reached in the log.

FIG. 7 depicts the Initialize Screen procedure, referred to as subroutine 76 in FIG. 6.

In Action rectangle 81 it starts forward processing the log 1 from LRBA 2—the last RBA handled by the previous change propagation or migration process.

In 82 we sequentially fetch log 1 records until we detect the end of the log in 83.

The identification of every transaction whose beginning is detected in 86 is added to the list of Not Committed transactions 72 where it stays until we detect the end of this transaction in 88 and 89.

The identification of transactions whose beginning has been detected in 86 but whose end is not detected in 88 and 89 remains in the list of Not Committed transactions 72.

Whenever in 88 and 89 we detect the end of a transaction whose beginning has not been detected in 86 we add its identification to the Not Started 73 list. In this case we also increment the counter 80 of transactions for which the end has been detected but the beginning has not.

Once we detect the end of the log in 83 we put the log's last RBA into ERBA 84. Then we position the log 1 on LRBA 2 again and prepare for a backward read 85 in search of the first transaction in the Not Started 73 list.

In 803 we read backwards from the log 1.

Every time we encounter the beginning of a transaction that appears in the Not Started list 73 we decrement the Not Started Counter 80 by one.

When, in 804 we discover that Not Started Counter 80 has become zero, we deduce that we reached the beginning of the first transaction we wish to handle and in 809 we update Start RBA 71 accordingly.

The above algorithm has been selected in this embodiment for clarity reasons. There are a few ways it can be improved to achieve better performance.

One such improvement is to perform the sort and collapse procedure, depicted in FIG. 8, for the log records starting at LRBA in this stage already, avoiding the need to read this part of the log again. In some implementations of DB2 the transaction ID is the log RBA of the log record designating the start of the transaction. In such cases, there is no need to read the log backwards; one could just go directly to the minimal log RBA appearing in the Not Started list 73.

FIG. 8 depicts the Sort and Collapse procedure invoked at 707 in FIG. 6.

This procedure signals to the Sort procedure 90 that the input phase has completed. The Sort 90 procedure sorts the records by RID.

The sort output exit then repeatedly fetches records from the Sort Output Pipe 91 until it detects the end of this pipe in 93.

Whenever a new RID is detected in 95 the condensed record created for the previous RID is written 96 into the condensed table 4. Then processing starts for the new RID.

In 900 we check whether the first update identified for the new RID is an insert operation. If it is, no Before Image will be created and we signal this decision in 902 and proceed with the creation of the tentative After Image in 904. This after image is tentative since it may later be replaced.

If in 900 we find that the first operation for the new RID is not an insert, a Before Image should be created. In 901 we create a Before image. Then we go on to 903 and check whether or not the first operation for this RID is a delete operation. If it is, we tentatively signal (in 905) that no after image should be created. This signal is tentative since it may be overridden by decisions resulting from additional records with the same RID.

If in 95 we discover that the record belongs to the current RID and not to a new one, we only need to decide whether or not we should replace the after image or override the decision whether or not to create an after image. We decide about these questions in 97. If the current record represents a delete operation we tentatively signal in 98 that no after image should be created. Otherwise we create in 99 a new tentative after image.

When the end of the sort output pipe 91 is detected in 93 we write the condensed record representing the changes to the last RID.

FIG. 9 describes the Write Condensed Record referred to in FIG. 8, subroutines 94 and 96.

Here we transform the before and after image we created in memory to at most two rows in the relevant condensed table 4.

In 100 we verify whether or not a row representing the before image should be created. If such a record should be created we create a before image row matching the description appearing in the explanation of FIG. 3.

Then we check whether or not an after image should be created 103. If it should then in 104 we create the appropriate after image row in the condensed table 4.

FIG. 10 describes the direct ordered update process.

This process can be used instead of the more elaborate process described in FIG. 2 in cases where the target table has a unique key in place during the change propagation process, protecting it from the insertion of duplicate records.

The algorithm described in this figure, processes the log records directly in the order or their appearance on the log, directly deriving for each of them, its impact on the target table.

The general structure of this figure is identical to that of FIG. 6, with the following exception: instead of sending the records to a sort process, it immediately derives their impact on the target tables through the calls to the process record functions at 203 and 205. The ground for these calls, is set at the initialize record processing (20) and the last records are processed in terminate record processing (207).

FIG. 11 describes the initialize record processing function invoked in (20) of FIG. 10.

This function starts a parallel execution of select statements filtering the log through the various single table sub conditions defined in the migration.

In this parallel execution, each record will be screened by all the single table sub conditions referring to the table it originated in (recall that each log record represents the before or after image of a table row). It is important that this mechanism of parallel execution of the select statements returns the selected rows in the exact order of their appearance on the log. This means that no buffering of selected rows is permissible; each row that has been selected by any of the select statements should be immediately propagated to the higher level. Since synchronized parallel execution of select statements is not supported by the ODBC standard, this mechanism cannot, in general, be efficiently implemented through a standard SQL engine. Since efficiency is the reason for this whole process, a special purpose mechanism should be developed for such a synchronized execution to occur.

FIG. 12 describes the process record function, referred to in 203 and 205 of FIG. 10.

This is the function that actually performs the synchronized execution of the various select statements and implements the derived changes to the target tables.

As can be seen in 47, this function derives the impact of the changes to a group of consecutive log records referring to the same RID, once a record referring a new RID or the end of the input are encountered.

The delete statements are created at 49 in exactly the same way as in (48) of FIG. 3 but here they are implemented immediately upon creation (and not collected into a delete statements file).

In 52, update statements are decomposed as in FIG. 4 and then directly implemented.

When the need to insert new rows is detected (in 48 or as a result of the decomposition in 52) we do it in a process that is almost identical to the one described in FIG. 5. The only exception is that now the insert table contains only a single row (the current row from the log) and the ignore files are empty (since we rely on the unique key of the target). This means that in this process the current tables serve as the old ones.

FIG. 13 describes the "terminate record processing" function, invoked at 207 of FIG. 10. Since, as explained, the impact of a group of consecutive records referring the same RID is inferred only when a record referring a new RID is encountered, we have to complete the record processing for the last RID, when the end of the data is encountered.

This is the purpose of the loop described in FIG. 13.

I claim:

1. A method of change propagation in a migration from at least one source table to a target table in a database management system for a database containing said source table and having a log in which each specific record has a data-independent key enabling the finding of said specific record in the log and where said data-independent key is always larger for newer records than for older records, the method comprising:

for supporting a change-propagation process for migrations that use more than one source-table instance for single-table subcondition traceable migrations, for supporting a change-propagation process for fixed environment traceable migrations, for supporting a change-propagation process for fixed environment traceable migrations without relying on a stable version of an optionally changeable source table, or for supporting a change-propagation process for single-table instance migrations without relying on a stable version of an optionally changeable source table, the steps of:

(a) deriving from said log of said database containing said source table a last data-independent key representing an immediately previous migration;

(b) for a particular migration definition and the respective last data-independent key derived in step (a), for a source table undergoing a change involving a migration, generating a condensed table containing at most two records for a record identifier of each data row which has changed in the source table after the completion of a previous migration or change propagation process, the two records being selected from before and after images of the data row which has changed in the source table or from a before image of a first pair of said images and an after image of a last pair of said images where the same data row is changed a number of times and a respective pair of images are formed with each change;

(c) for each source table appearing in said migration definition, eliminating redundant changes and from said migration definition and the condensed table, generating a file containing delete statements, a file containing update statements, an insert table and an ignore file containing instructions to ignore specific rows in a table;

(d) thereafter:

(d1) implementing deletes based upon the file containing delete statements and updating the target table correspondingly, (d2) implementing updates based upon the file containing update statements and updating the target table correspondingly, (d3) where a single source table is involved in said migration definition and said migration definition does not involve an SQL join step, implementing insert commands contained in said insert table and updating the target table correspondingly, and (d4) where a plurality of source tables are involved in said migration definition and said migration definition includes an SQL join step, joining each insert table generated from one of said plurality of source tables with at least parts of the other source tables of said plurality of source tables based upon the migration definition, the ignore file, the respective source table and the insert table to generate a respective insert statement file; and (e) updating said target table based upon commands in said insert statement file.

2. The method defined in claim 1 wherein, in step (d4), for source tables $T_1, T_2, T_3, \ldots$ having respective insert tables $i_1, i_2, i_3, \ldots$, each insert table $i_1, i_2, i_3, \ldots$ from one source table $T_1$ or $T_2$ or $T_3$ is iteratively joined to that portion of the other source tables $T_2, T_3, \ldots, T_1, T_3, \ldots T_1, T_2, \ldots$ ignoring rows in response to a respective instruction of the respective ignore file.

* * * * *